E. W. Gurnee.
Fruit Gatherer.
Nº 67,296.            Patented Jul. 30, 1867.
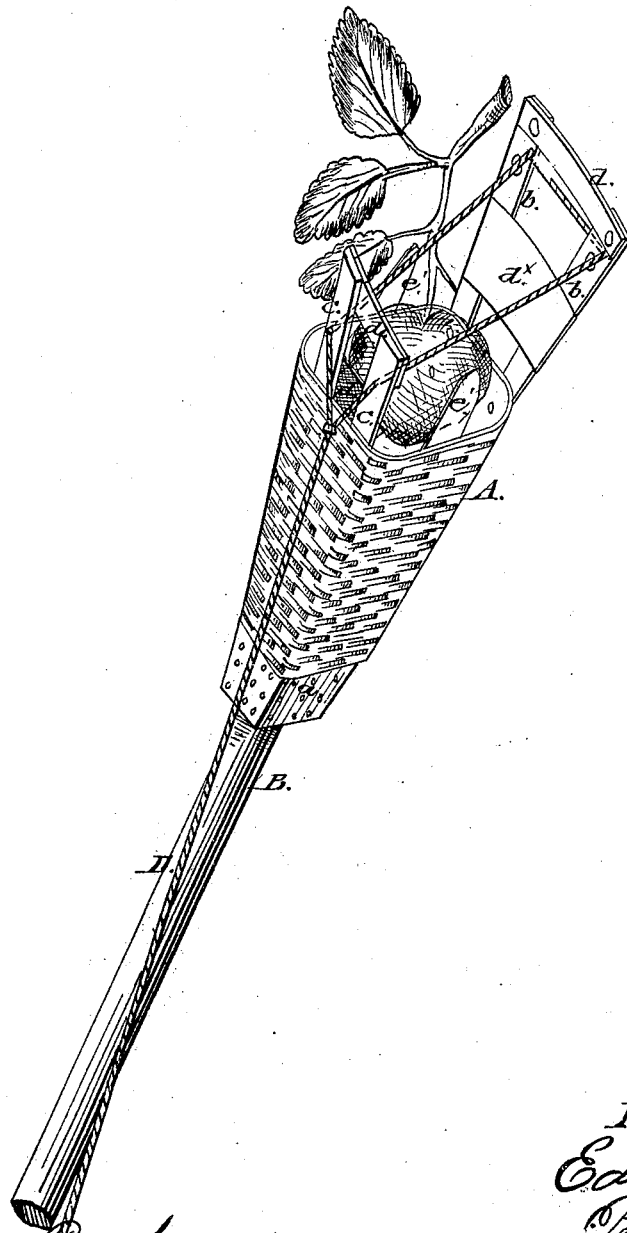
Witnesses:
Theo Gusche
Wm Trewin
Inventor:
Edw. W. Gurnee
Per Munn & Co
Attorneys

United States Patent Office.

EDWARD W. GURNEE, OF HAVERSTRAW, NEW YORK.

Letters Patent No. 67,296, dated July 30, 1867.

---

IMPROVEMENT IN FRUIT-PICKER.

---

*The Schedule referred to in these Letters Patent and making part of the same.*

---

TO ALL WHOM IT MAY CONCERN:

Be it known that I, EDWARD W. GURNEE, of Haverstraw, in the county of Rockland, and State of New York, have invented a new and improved Fruit-Picker; and that the following description, taken in connection with the accompanying drawing, hereinafter referred to, forms a full and exact specification of the same, wherein I have set forth the nature and principles of my said improvements, by which my invention may be distinguished from all others of a similar class, together with such parts as I claim, and desire to have secured to me by Letters Patent.

This invention relates to a new and improved device for picking fruit from trees, and is designed to facilitate the tedious operation of direct picking by hand, which involves the necessity of climbing trees and venturing out on small branches.

The object of the invention is to obtain a simple, cheap, and durable implement for the purpose specified, and one which may be readily kept in repair and proper working order by any person of ordinary ability.

The accompanying drawing represents a perspective view of my invention.

A represents a funnel-shaped splint basket, the smaller and inner end having a wooden block, $a$, inserted in and secured to it in any proper manner. This block is bored to receive the end of a wooden handle, B, of any desired length. Two splints $b\ b$ and $c\ c$, at opposite sides of the large and open end of the basket A extend outward a considerable distance, $b\ b$ further than $c\ c$, and these splints, each pair, are connected by strips $d$ of metal or any suitable material; and they have also, below the strips $d$, canvas cloth or other material $d^\times$ attached, as shown clearly in the drawing. C is a cord, which passes through holes in both pairs of splints $b\ b$, $c\ c$, and has both ends connected to another cord, D, which extends the whole length of the handle B, passing through one or more eyes $e$. The splints $b\ b$, which are the longer ones, have sufficient spring or elasticity to yield or give under the pull of the cord D, and the strip $d$ of said splints serves as a movable jaw, while the strip $d$ of the shorter splints $c\ c$ serves as a fixed or stationary jaw, the pull of the cord being only on the splints $b\ b$. The two sides of the large open end of the basket, where the splints $b\ b$, $c\ c$ are not attached, have each a short splint, $e'$, projecting from them, and these splints $e$, with the canvas or cloth $d^\times$, prevent the fruit dropping out of the basket when the long splints $b\ b$ are drawn over so that their strip $d$ may clutch the stem of the fruit between it and the strip $d$ of the shorter splints $c\ c$, and admit of the fruit being detached, the splints $b\ b$ being kept drawn over towards the splints $c\ c$ until the basket A is adjusted over the barrel or other receptacle designed to receive the fruit, when the cord is relaxed or let free, and the splints $b\ b$ move back by virtue of their own elasticity, and the fruit drops into the receptacle.

It will at once be seen that this device may be constructed at a very small cost, and kept in repair by any one of ordinary ability. If necessary or desired, the splints $b\ b$ may be backed by metal springs constructed of thin steel plates.

Having thus described my invention, I claim as new, and desire to secure by Letters Patent—

The basket A, provided with the projecting splints $c\ c$ at one side, and the projecting elastic splints $b\ b$ at the opposite side, the splints, each pair, being connected at their ends by the strips $d$, and having the cords C D applied, and all arranged substantially as and for the purpose set forth.

I further claim the canvas or other material $d^\times$, attached to the splints $b\ b$, $c\ c$, in connection with the projecting splints $c'\ c'$, substantially as and for the purpose specified.

The above specification of my invention signed by me this 30th day of May, 1867.

EDWARD W. GURNEE.

Witnesses:
WM. F. MCNAMARA,
J. A. SERVICE.